(12) United States Patent
Su et al.

(10) Patent No.: US 9,992,499 B2
(45) Date of Patent: Jun. 5, 2018

(54) ADAPTIVE STREAMING TECHNIQUES

(71) Applicant: Apple Inc., Cupertino, CA (US)

(72) Inventors: Yeping Su, Sunnyvale, CA (US); Hao Pan, Sunnyvale, CA (US); James O. Normile, Los Altos, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 759 days.

(21) Appl. No.: 14/190,880

(22) Filed: Feb. 26, 2014

(65) Prior Publication Data

US 2014/0241415 A1 Aug. 28, 2014

Related U.S. Application Data

(60) Provisional application No. 61/769,944, filed on Feb. 27, 2013.

(51) Int. Cl.
*H04N 19/152* (2014.01)
*H04N 19/142* (2014.01)
(Continued)

(52) U.S. Cl.
CPC ......... *H04N 19/152* (2014.11); *H04N 19/142* (2014.11); *H04N 21/23418* (2013.01);
(Continued)

(58) Field of Classification Search
None
See application file for complete search history.

(56) References Cited

U.S. PATENT DOCUMENTS 6,275,536 B1 8/2001 Chen et al.
6,959,042 B1 10/2005 Liu et al.
(Continued)

FOREIGN PATENT DOCUMENTS

CN 1602592 A 3/2005
CN 100420250 C 9/2008
(Continued)

OTHER PUBLICATIONS

Jiang, Junchen, et al., Improving Fairness, Efficiency, and Stability in HTTP-based Adaptive Video Streaming with Festive, CoNEXT '12 (Dec. 2012).*
(Continued)

*Primary Examiner* — William C Vaughn, Jr.
*Assistant Examiner* — Lindsay Uhl
(74) *Attorney, Agent, or Firm* — Baker & Hostetler LLP; Robert L. Hails

(57) ABSTRACT

Systems and methods are presented for minimizing the suddenness and immediacy of changes to the video quality perceived by users due to bandwidth fluctuations and transitions between different bitrate streams. A method may include identifying an upcoming bitrate change in a bitstream and a nearest scene cut boundary from sync frame scene cut tags included in the bitstream. The method may include calculating whether waiting until the identified nearest scene cut boundary before changing the bitrate will cause the buffer to drop below a threshold. When the buffer is calculated to not drop below the threshold, the method may postpone the upcoming bitrate change until the identified nearest scene cut boundary.

22 Claims, 6 Drawing Sheets

(51) Int. Cl.
| | |
|---|---|
| *H04N 19/87* | (2014.01) |
| *H04N 21/234* | (2011.01) |
| *H04N 21/24* | (2011.01) |
| *H04N 21/44* | (2011.01) |
| *H04N 21/2343* | (2011.01) |
| *H04N 21/845* | (2011.01) |

(52) U.S. Cl.
CPC .. *H04N 21/23424* (2013.01); *H04N 21/23439* (2013.01); *H04N 21/2402* (2013.01); *H04N 21/44004* (2013.01); *H04N 21/44008* (2013.01); *H04N 21/8456* (2013.01)

(56) References Cited

U.S. PATENT DOCUMENTS

| | | | |
|---|---|---|---|
| 7,949,775 B2 | 5/2011 | Virdi et al. | |
| 7,962,640 B2 | 6/2011 | Lee | |
| 8,032,649 B2 | 10/2011 | Gupta et al. | |
| 8,205,004 B1 | 6/2012 | Kaufman et al. | |
| 8,265,140 B2 | 9/2012 | Mehrotra | |
| 8,325,821 B1 | 12/2012 | Kizhepat et al. | |
| 8,363,716 B2 | 1/2013 | Kalva et al. | |
| 8,566,393 B2 | 10/2013 | Myers et al. | |
| 2003/0055995 A1 | 3/2003 | Ala-Honkola | |
| 2003/0058947 A1 | 3/2003 | Peterson et al. | |
| 2003/0067872 A1* | 4/2003 | Harrell | H04L 29/06027 370/229 |
| 2003/0086128 A1 | 5/2003 | Gabrani et al. | |
| 2004/0172478 A1* | 9/2004 | Jacobs | H04N 21/234327 709/233 |
| 2004/0184526 A1 | 9/2004 | Penttila et al. | |
| 2004/0196975 A1 | 10/2004 | Zhu et al. | |
| 2005/0123058 A1 | 6/2005 | Greenbaum et al. | |
| 2008/0127258 A1 | 5/2008 | Walker et al. | |
| 2009/0031384 A1 | 1/2009 | Brooks et al. | |
| 2009/0282162 A1 | 11/2009 | Mehrotra et al. | |
| 2009/0310673 A1* | 12/2009 | Chung | H04N 19/147 375/240.03 |
| 2010/0131671 A1 | 5/2010 | Kohli et al. | |
| 2010/0135636 A1 | 6/2010 | Zhang et al. | |
| 2010/0189179 A1 | 7/2010 | Gu et al. | |
| 2010/0189183 A1 | 7/2010 | Gu et al. | |
| 2010/0235528 A1 | 9/2010 | Bocharov et al. | |
| 2010/0235542 A1 | 9/2010 | Visharam et al. | |
| 2010/0299552 A1 | 11/2010 | Schlack et al. | |
| 2010/0332671 A1 | 12/2010 | Alfonso et al. | |
| 2011/0080940 A1 | 4/2011 | Bocharov et al. | |
| 2011/0083037 A1 | 4/2011 | Bocharov et al. | |
| 2011/0238789 A1 | 9/2011 | Luby et al. | |
| 2012/0047542 A1* | 2/2012 | Lewis | H04N 21/44016 725/97 |
| 2012/0179833 A1 | 7/2012 | Kenrick et al. | |
| 2012/0320154 A1 | 12/2012 | Berger et al. | |
| 2013/0064283 A1* | 3/2013 | Sun | H04N 21/2343 375/240.01 |
| 2013/0091251 A1* | 4/2013 | Walker | H04N 21/6125 709/219 |
| 2013/0198328 A1* | 8/2013 | Green | H04L 67/02 709/217 |
| 2013/0307847 A1 | 11/2013 | Dey et al. | |
| 2013/0329781 A1 | 12/2013 | Su et al. | |

FOREIGN PATENT DOCUMENTS

| | | |
|---|---|---|
| CN | 101895748 A | 11/2010 |
| EP | 1298931 A2 | 4/2003 |
| EP | 1298931 A3 | 4/2003 |
| EP | 2410745 A1 | 1/2012 |
| GB | 2 395 387 A | 5/2004 |
| JP | 2011-523298 A | 8/2011 |
| KR | 10-2004-0031779 A | 4/2004 |
| KR | 10-2011-0106419 A | 9/2011 |
| WO | 0139502 A1 | 5/2001 |
| WO | 02/07164 A2 | 1/2002 |
| WO | 2003/009581 A1 | 1/2003 |
| WO | 03009581 A1 | 1/2003 |
| WO | 2004/045216 A1 | 5/2004 |
| WO | 2009/149100 A1 | 12/2009 |
| WO | 2013/004911 A1 | 1/2013 |

OTHER PUBLICATIONS

Jiang, J., et al., Improving Fairness, Efficiency, and Stability in HTTP-based Adaptive Video Streaming with Festive (2012).*

International Search Report and Written Opinion, dated Aug. 20, 2014, from corresponding International Application No. PCT/US2014/018702, filed Feb. 26, 2014.

Mok et al., "QDASH: A QoE-aware Dash system", Proceedings of the 3rd Multimedia Systems Conference, Feb. 24, 2012. pp. 11-22.

Jiang et al., "Improving Fairness, Efficiency, and Stability in HTTP-based Adaptive Video Streaming with Festive", Emerging Networking Experiments and Technologies. ACM. Dec. 10-13, 2012, Nice, France, pp. 97-108.

Ischmidt, "An Architecture for Distributed, Interactive, Multi-Stream, Multi-Participant Audio and Video", Technical Report No. CSL-TR-99-781, Apr. 1999, 45 pages.

Telefon AB LM Ericsson et al., "Segment Alignment and Related Issues in HTTP Streaming," Tdoc 54 AHI151, TSG-SA4#6-SWG on HTTP Streaming, Mar. 2-4, 2010, Aachen, Germany, 3 pages.

Oyman et al., "Quality of Experience for HTTP Adaptive Streaming Services," IEEE Communications Magazine, IEEE Service Center, Piscataway, US, vol. 50, No. 4, Apr. 1, 2012, pp. 20-27.

"Segment Alignment and Related issues in HTTP Streaming"; Telefon AB LM Ericsson, ST-Ericsson SA; Tdoc S4 AHI151; Mar. 2010; 3 pages.

Taiwanese Office Action, dated Dec. 28, 2015, from corresponding Taiwanese Patent Application No. 103106874, filed Feb. 27, 2014.

Taiwanese Office Action, dated Feb. 25, 2015, from TW Patent Application No. 102120403, filed Jun. 7, 2013.

\* cited by examiner

100

200

300

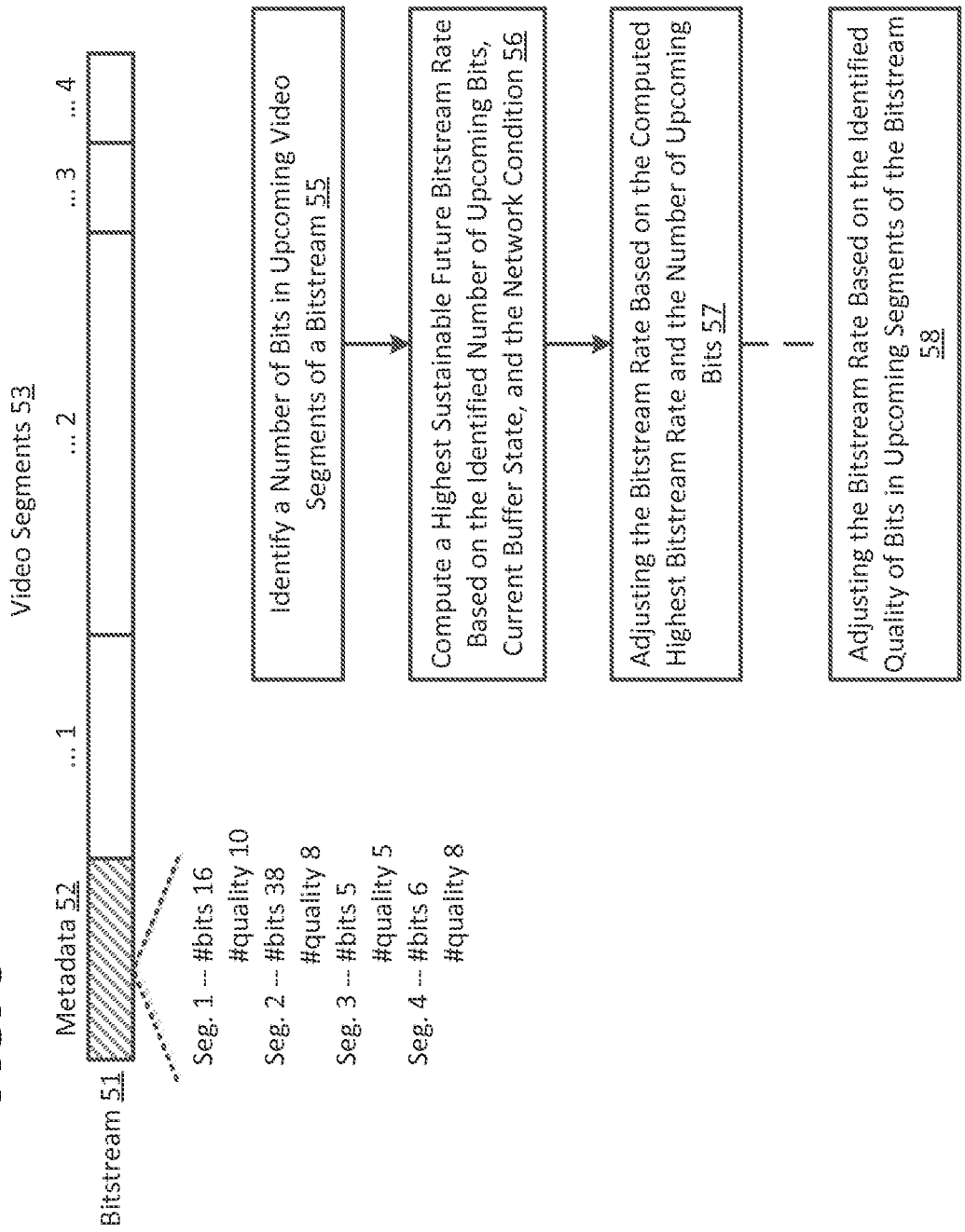

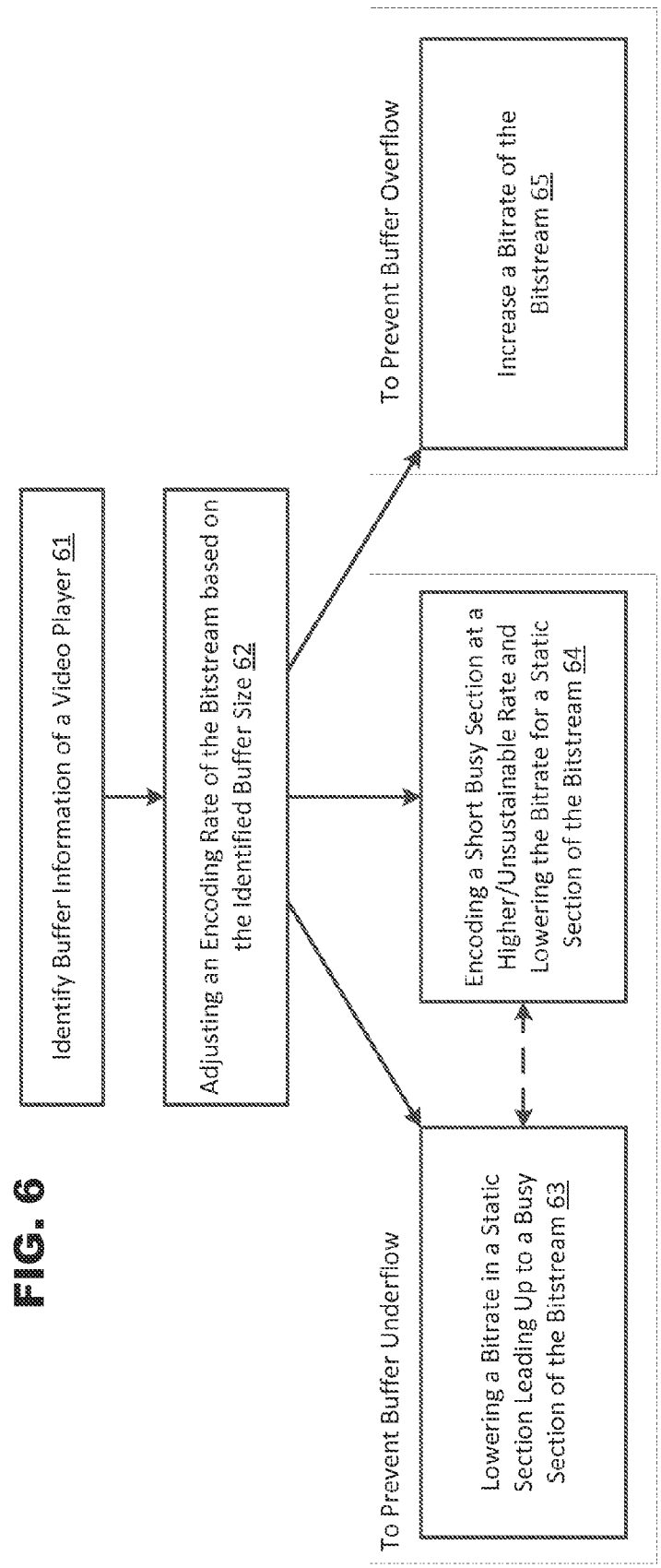

ADAPTIVE STREAMING TECHNIQUES

PRIORITY CLAIM

The present application claims priority to U.S. Provisional Application No. 61/769,944, filed on Feb. 27, 2013, the entirety of which is incorporated by reference herein.

BACKGROUND

Adaptive streaming techniques are designed to stream multimedia data over heterogeneous and dynamic computer networks. As the Internet has grown, additional protocols, security devices, and bandwidth management tools have been developed. Some of these devices and tools, such as firewalls and proxy servers, have blocked or interfered with different video transmission protocols. As a result, Hypertext Transfer Protocol (HTTP)-based video stream protocols have been used increasingly to ensure that video data is successfully transmitted to and viewable by users who are able to view standard HTTP traffic. HTTP based video streaming protocol also do not require special server software and are compatible with any firewall and proxy server that allows standard HTTP traffic. Adaptive streaming supports several alternate video streams at different bit rates. Client video players have been configured to select and/or switch between the different streams to select the best bit rate given network conditions. In the past, bitstream switching has only occurred on sync frames.

Players also have included a bitstream buffer to temporarily store the streamed video data once it has been received by the player. The buffer allows the streamed video data to be decoded without jitter caused by network bandwidth fluctuations. If the network bandwidth decreases sufficiently, the bitstream buffer may eventually get depleted. To prevent this, the player has been configured to switch to a lower bitrate stream that would reduce the likelihood of the buffer being depleted. Some players have also used a network bandwidth estimator to decide when the bandwidth has increased enough to support a switch to a higher bitrate stream. Bandwidth fluctuations and the transitions between different bitrate streams have resulted in sudden and immediately noticeable changes to the video quality perceived by users.

There is a need to minimize the suddenness and immediacy of changes to the video quality perceived by users due to bandwidth fluctuations and transitions between different bitrate streams.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

FIG. 5 illustrates a process for adjusting a bitstream rate based on tagged information in video data according to an embodiment of the present invention.

FIG. 6 illustrates an exemplary process for optimizing encoding when the encoder is provided with a player buffer size according to an embodiment of the present invention.

DETAILED DESCRIPTION

Embodiments of the present invention provide systems and methods for minimizing the suddenness and immediacy of changes to the video quality perceived by users due to bandwidth fluctuations and transitions between different bitrate streams. Each of the techniques discussed herein may be used by itself or in conjunction with one or more of the other techniques discussed herein.

Figure 1:
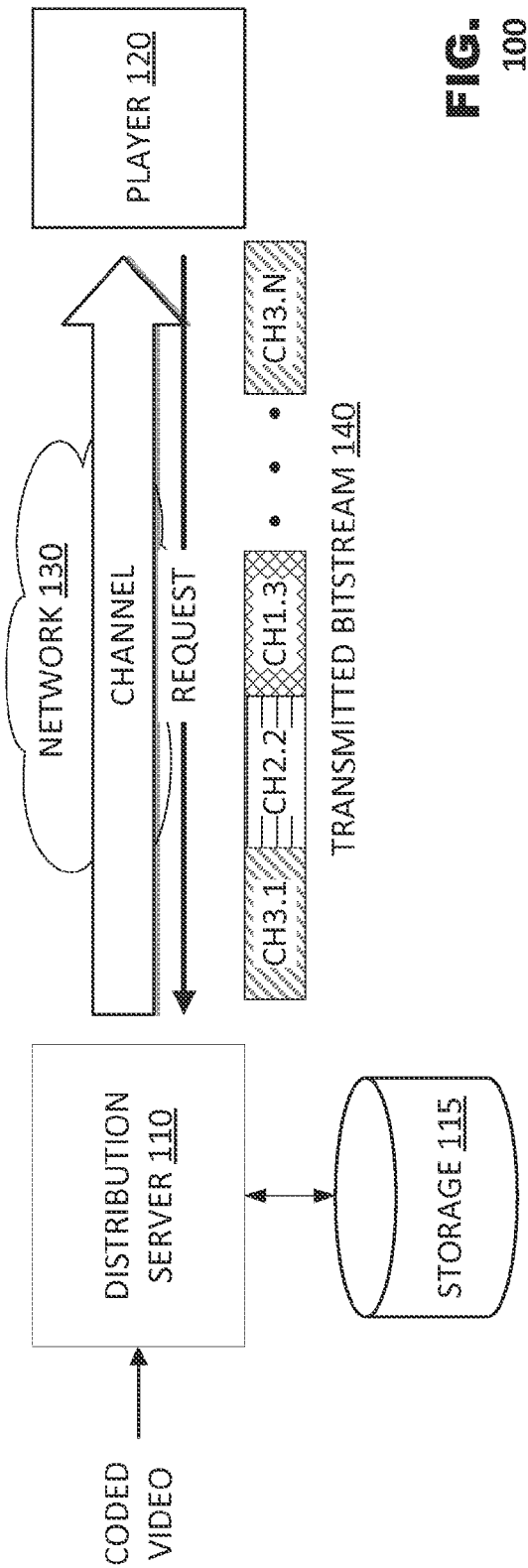
FIG. 1 illustrates a simplified block diagram of a video distribution system suitable for use with the present invention.
Figure 1:
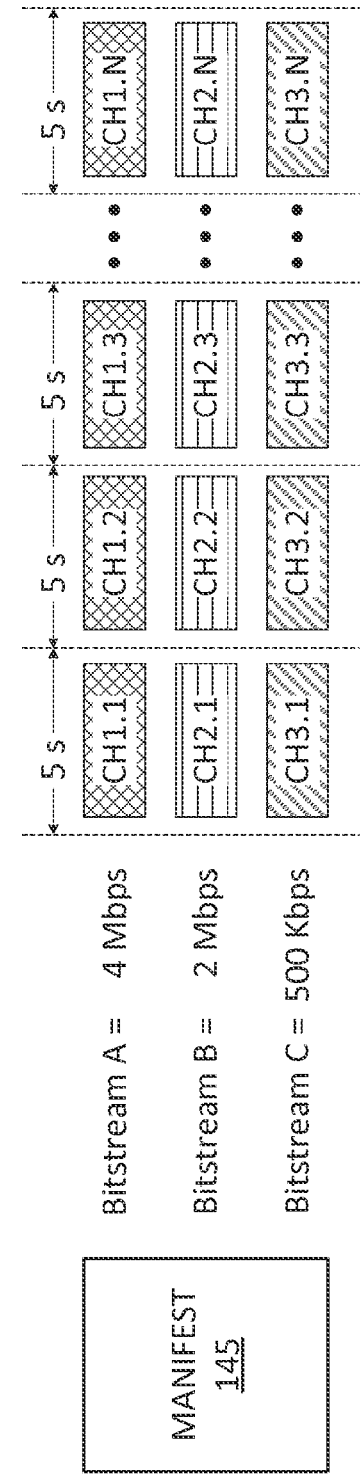

FIG. 1 illustrates a simplified block diagram of a video distribution system 100 suitable for use with the present invention. The system 100 may include a distribution server system 110 and a client device containing a video player 120 connected via a communications network 130. The distribution server 110 may include a storage system 115 storing a variety of video content items (e.g., movies, television shows and other motion picture content) for download by the client player device 120.

The distribution server 110 may store several copies of the video content items as coded video streams, each of which are coded at a respective bit rate, frame rate and frame size. The video streams are parsed into a plurality of "chunks," segments of the coded video representing video content of a predetermined duration. The example of FIG. 1 illustrates three coded video bitstreams A, B, and C that are coded at respective bitrates (4 Mb/s, 2 Mb/s and 500 Kb/s respectively) where each chunk represents 5 seconds of source video. The distribution server 110 also may store an index file 145, called a "manifest" file herein, that associates the coded video streams with the video content item and correlates chunks of each coded video stream with corresponding chunks of the other video streams.

When the distribution server 110 receives a request for a video content item, the server 110 may provide data from the manifest file 145 to the client device 120. Armed with information representing different data rates of the coded video streams, the client device 120 may identify one of the video streams or one of the bit rates for delivery of video. The device's identification of delivery bandwidth may be based on an estimate of bandwidth available in the network 130 and/or an estimate of processing or display capabilities available at the client device 120 to decode received data. In response, the distribution server 110 may retrieve chunks of data from storage 115 at the specified data rate, may build a channel stream from the retrieved chunks and may transmit the channel stream 140 to the client device 120.

Over time, as the distribution server 110 delivers its chunks to the client device 120, the client device 120 may request delivery of the video content item at a different data rate. For example, the client device 120 may revise its estimates of network bandwidth and/or local processing or display capabilities. In response, the distribution server 110 may retrieve chunks corresponding to a different data rate and build them into the channel stream. The client device 120 may request different data rates repeatedly during a delivery session and, therefore, the channel stream 140 that is delivered to the client device 120 may include chunks taken from a variety of the video coding streams.

The manifest file may include different syntactic elements which may be represented as metadata. For example, the syntactic elements may include, for each stream, an indication whether it contains chunks with different resolutions. The player accordingly may decide whether it should update video resolution information at the beginning of chunks.

In another example, for each stream, the manifest file may include data indicating whether the first frames of all the chunks are synchronization frames. The player accordingly may decide which frame or chunk to switch to when switching among streams.

In a further example, for each stream and/or chunk, the manifest file may include data indicating whether an identified synchronization frame is also part of a scene cut. The player accordingly may decide to postpone or delay a switching among streams until a next scene cut occurs at an identified synchronization frame.

In another example, for each stream and/or chunk, the manifest file may include data indicating the visual quality of the stream or chunk. The player accordingly may switch among streams to achieve the best visual experience, for example, by maximizing average visual quality and/or minimizing visual quality jumps.

In another example, for each stream and/or chunk, the manifest file may include an indication of its bit rate and/or the number of bits in the chunk. The player may determine its buffering and switching behavior according to the chunk bit rates and/or the identified number of bits in each chunk.

In another example, for each stream and/or chunk, the manifest file may include data indicating the resolution of the chunks. The player accordingly may decide whether it should update video resolution based on the resolution of the chunks.

In another example, for each chunk, the manifest file may include data indicating required bandwidth to play the rest of the stream starting from or after the chunk. The player accordingly may decide which stream to switch to, based on this data.

In another example, for each stream and/or chunk, the manifest file may include data indicating the initial buffering condition when starting at a sync frame. The buffering condition may indicate the number of bits that should be buffered before decoding and/or starting playback given a predetermined buffer size and a network bandwidth. The number of bits may be selected to avoid a bit stream buffer underflow that may cause interruptions during playback. The player accordingly may decide how much to buffer when there is a random access event.

In another example, for each chunk, the manifest file may include data indicating whether its first frame is a synchronization frame. The player accordingly may decide which frame or chunk to switch to when switching among streams.

In another example, for each chunk, the manifest file may include data indicating a stream the player should switch to after processing the chunk.

Figure 2:
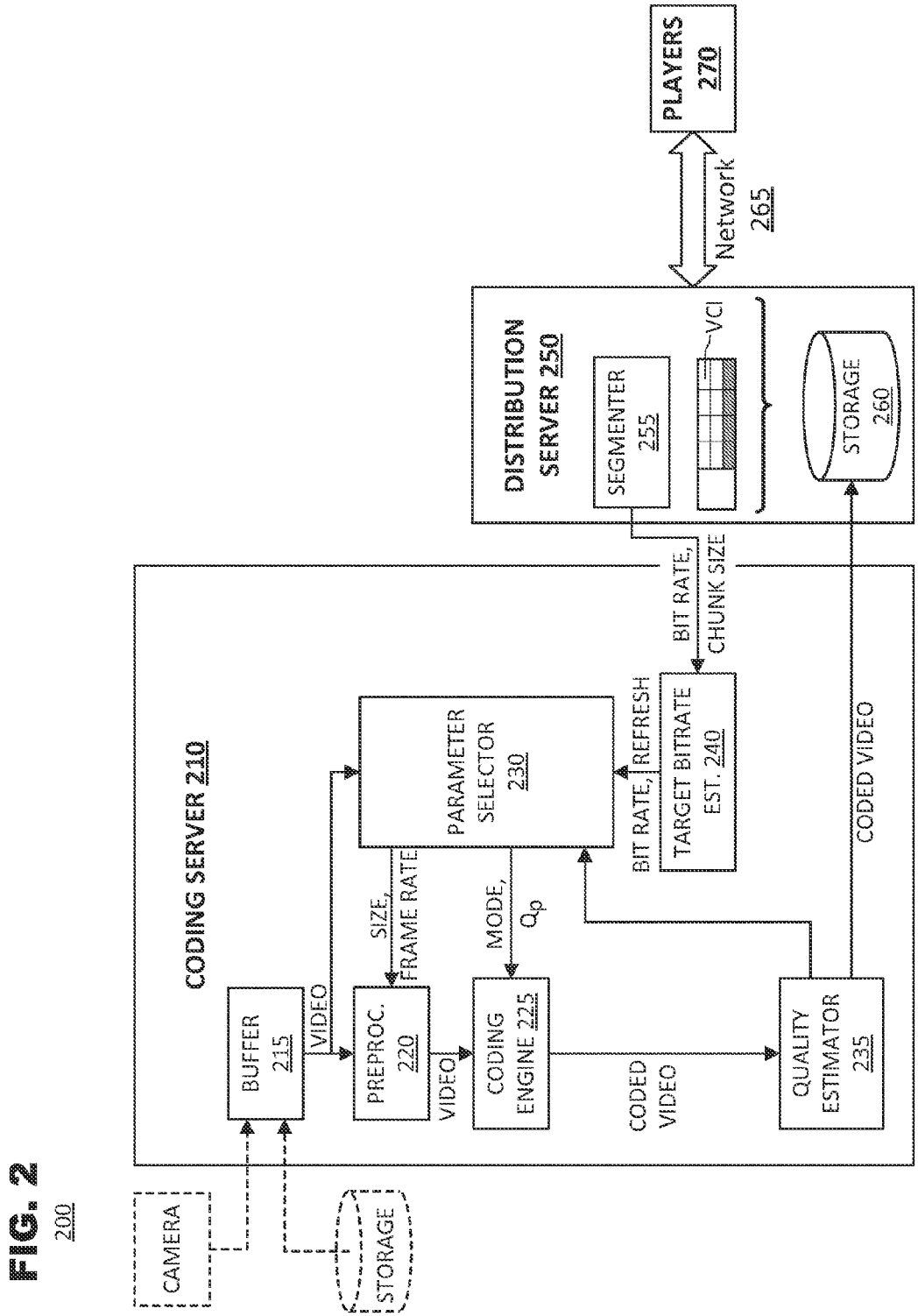
FIG. 2 illustrates a simplified block diagram of a system having an integrated coding server and distribution server according to an embodiment of the present invention.

FIG. 2 illustrates an exemplary video coding and distribution system according to an embodiment of the present invention. As shown in FIG. 2, the system 200 may include an integrated coding server 210 and distribution server 250.

The coding server 210 may include a buffer storage device 215, a preprocessor 220, a coding engine 225, a parameter selector 230, a quality estimator 235, and a target bitrate estimator 240. The buffer storage device 215 may store input video, typically from a camera or a storage device which is sent to the preprocessor 220 and/or parameter selector 230.

The preprocessor 220 may apply video processing operations to the video. For example, the preprocessor 220 may alter a size and/or a frame rate of the video sequence. The preprocessor 220 may also include appropriate storage so that size and/or frame rate modifications selected by parameter selector 230 may be performed repeatedly on a common video sequence as the coding server 210 generates its various coded versions of the sequence.

The coding engine 225 may apply data compression operations to the video sequence outputted by the preprocessor 220. The coding engine 225 may operate according to any of the common video coding protocols including the MPEG, H.263, H.264 and HEVC families of coding standards. The coding engine 225 may apply coding parameters to different elements of the video sequence, including, for example a coding mode selection, such as whether to code an input frame as an I-frame, P-frame or B-frame and/or quantization parameters identifying one or more quantization parameter levels to apply within frame as coded video data.

The parameter selector 230 may generate parameter data supplied to the preprocessor 220 and/or coding engine 225 to govern their operation. The parameter selector 230, for example, may cause the preprocessor 220 to alter the size and/or frame rate of data output to the coding engine 225. The parameter selector 230 may impose coding modes and/or quantization parameters to the coding engine 225. The parameter selector 230 may select the coding parameters based on bit rate estimates received from the target bit-rate estimator 240 and based on complexity estimates of the source video.

The quality estimator 235 may estimate a quality of coded video data output by the coding engine. The quality may be estimated based on an expected or measured error that may occur during decoding. The quality estimator 235 may output digital data representing a quantitative estimate of the quality of the coded video data.

The target bit-rate estimator 240 may generate bit-rate estimates for segments of video based on the data rates to be supported by the distribution server 250.

During operation, the target bit-rate estimator 240 may apportion a bit rate to the video sequence and select a refresh rate based on data rate and chunk size estimates provided by the distribution server 250. In response to the bit rate selected by the target bit-rate estimator 240 and based on analysis of the video sequence itself, the parameter selector 230 may select operational parameters for the preprocessor 220 and/or coding engine 225. For example, the parameter selector 230 may cause the preprocessor 220 to adjust the frame size (or resolution) of the video sequence. The parameter selector 230 also may select coding modes and quantization parameters to frames within the video sequence. The coding engine 225 may process the input video by motion compensation predictive techniques and output coded video data representing the input video sequence.

The quality estimator 235 may evaluate the coded video data and estimate the quality of the video sequence coded according to the selected parameters. The quality estimator 235 may determine whether the quality of the coding meets predetermined qualitative thresholds associated with the bit rate set by the distribution server 250. If the quality estimator 235 determines that the coding meets the thresholds, the quality estimator 235 may validate the coding. By contrast, if the quality estimator 235 determines that the coding does not meet sufficient quality thresholds associated with target bit rate, the quality estimator 235 may revise the coding parameters applied by the parameter selector 230 and may cause the preprocessor 220 and coding engine 225 to repeat operation on the source video.

Once the parameter selector 230 selects a set of processing and coding parameters that satisfy quality metrics established by the quality estimator 235, the coding server 210 may advance to the next bit rate supported by the distribution server 250. Again, the parameter selector 230 and quality estimator 235 may operate recursively, selecting parameters, applying them in preprocessing operations and coding, estimating quality of the coded video data obtained thereby and revising parameters until the quality requirements are met.

Scene Cut Tags

The video sequence may include different scenes, camera angles, and backgrounds. A scene cut may include a transition between these different scenes, angles, or backgrounds. For example, during an interview that is to be broadcasted, a first camera may be positioned on the interviewee and a second camera on the interviewer. A scene cut may occur each time the video switches between images of the interviewee and the interviewer. Video quality changes perceived by users due to bitstream switching may be less visible when they occur during these scene cuts or at scene cut boundaries.

An encoder (e.g., coding server 210) may identify and then tag sync frames that are also scene cuts. The tags may be inserted in the manifest file, which may be transmitted at least in part to the player 270 to enable the identification of upcoming scene cuts ahead of time by the player 270. The player 270 may use the tagged sync frame information to select when to transition between different bitstream rates. For example, the player 270 may use the tagged sync frame information to allow bigger bitstream rate transitions than would otherwise be permitted for non-tagged sync frames.

Figure 3:
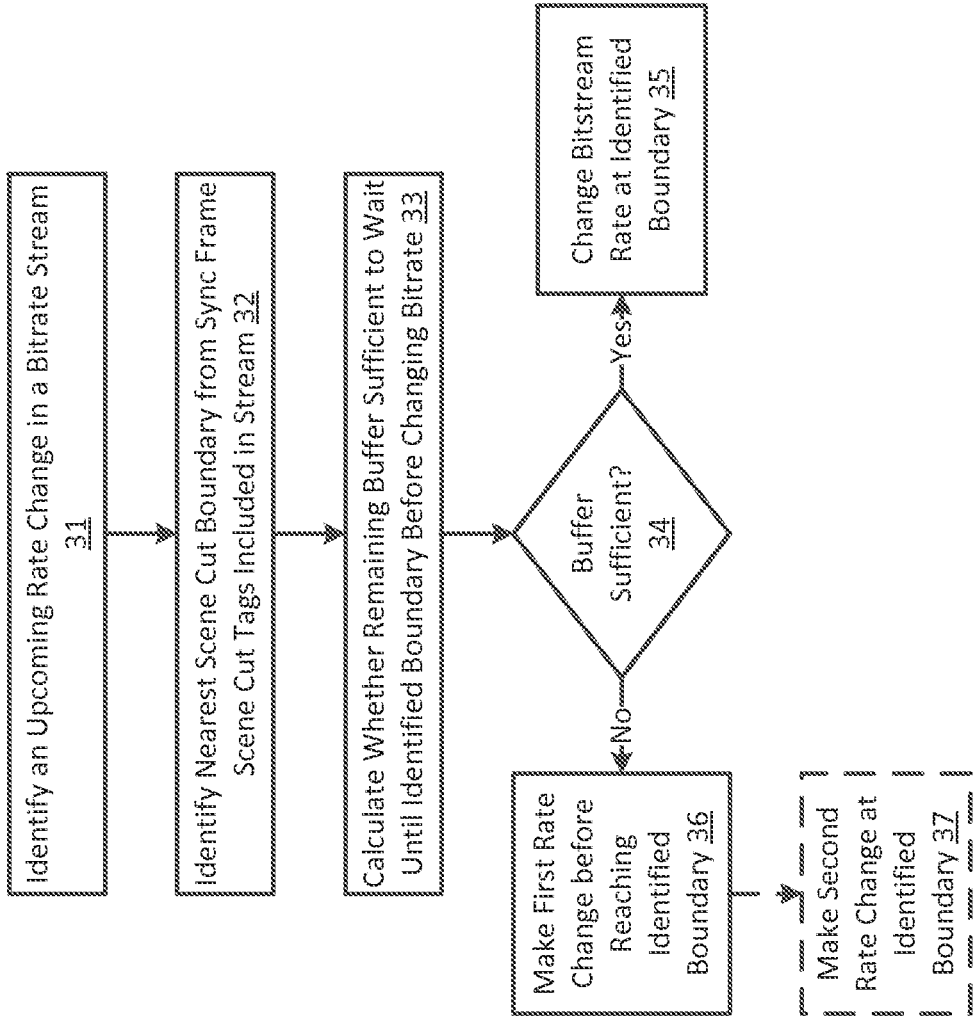
FIG. 3 illustrates an exemplary process for implementing bitrate changes during scene cuts according to an embodiment of the present invention.

FIG. 3 illustrates an exemplary process 300 for implementing bitrate changes during scene cuts in an embodiment of the invention.

In box 31, an upcoming rate change in a video bitrate stream may be identified. The upcoming change may be identified through a change in network conditions or bandwidth, a change in an available buffer size at the player, a change in the data being transmitted, or another event warranting a rate change of a selected bitrate stream.

Once an upcoming rate change has been identified, in box 32, a nearest scene cut boundary may be identified from sync frame scene cut tags included as part of the selected bitrate stream being transmitted to the player. In some instances these scene cut tags may be included in the manifest file data that is transmitted to the player. In another embodiment, the player may analyze the received video sequence (e.g., video sequence stored in the buffer) to determine the scene change.

In boxes 33 and 34, a determination may be made as to whether a remaining buffer at the player is sufficient to enable a postponement of a bitrate change until the nearest scene cut boundary identified in box 32 is reached. The remaining buffer at the player may be sufficient if the remaining buffer exceeds a threshold in view of the postponement needed until the nearest scene cut boundary identified in box 32 is reached. The threshold may be a time threshold, such as at least x seconds of video data; a quantity threshold, such as at least y bits of video data or at least z percent full; or another type of threshold.

If the remaining buffer is determined to be sufficient, then in box 35, the bitrate change may be postponed until the sync frame containing the nearest scene cut boundary identified in box 32 is reached.

If the remaining buffer is determined to be insufficient, then in box 36, a first bitrate change may be made before reaching the sync frame containing the nearest scene cut boundary identified in box 32. In some instances, the first bitrate change in box 36, may be selected to be a minimum bitrate change necessary to ensure that the remaining buffer at the player is sufficient to enable a postponement of a bitrate change until the nearest scene cut boundary identified in box 32 is reached. In other instances, the bitrate change in box 36 may set to a predetermined rate change amount or the bitrate change may be capped so as not to exceed a predetermined amount.

In box 37, a second or any further bitrate changes needed to achieve the identified rate change in box 31 may be implemented at the sync frame containing the nearest scene cut boundary identified in box 32 if needed.

Gradual Switching

In the past, when an available network bandwidth suddenly dropped, the player responded by immediately switching to a lower bitrate stream corresponding to the bandwidth drop. A high bandwidth drop resulted in a large decrease in the bitrate causing sudden quality drops that were immediately noticeable by users watching a video in the player. In some embodiments, a staged reduction in the bitrate may occur to avoid the sudden quality drops that are disfavored by users.

A staged bitrate reduction may occur by starting to reduce the bitrate earlier, before the buffered video data drops below a predetermined threshold. The bitrate reduction may then be spread out over a predetermined period, so that instead of one hard, noticeable bitrate drop, the bitrate is reduced incrementally over time. This technique may also be applied when increasing the bitrate due to an increase in available bandwidth.

Figure 4:
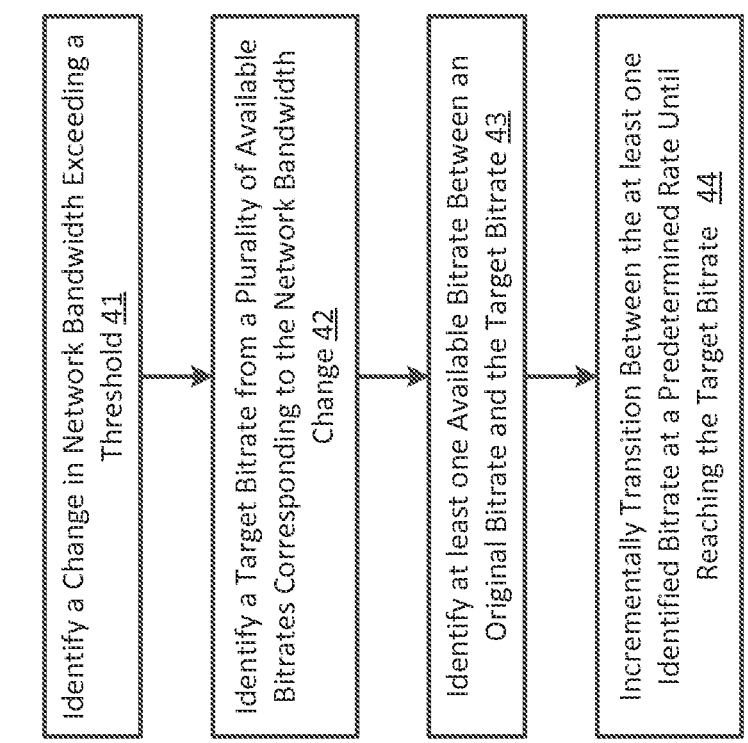
FIG. 4 illustrates an exemplary process for gradual switching according to an embodiment of the present invention.

FIG. 4 illustrates an exemplary process for gradual switching of the bitrate according to an embodiment of the present invention.

In box 41, a network bandwidth change may be identified. The network bandwidth change may be identified by comparing the network bandwidth change to a threshold. The network bandwidth change may be identified using network diagnostic tools, including applications that detect network performance issues, detect missing packets, track response times of routers, switches, servers and other device, and/or analyze network performance and traffic. The threshold may be a predetermined minimum bandwidth change value before implementing gradual switching. The threshold value may be selected so that gradual switching is implemented only if there is at least a predetermined number of intermediate bitrates to transition to when switching between an original bitrate and a new target bitrate.

In box 42, a new target bitrate may be identified from a plurality of available bitrate streams specified in the manifest file or obtained from another source. The bitrate from the available bitrate streams that is able to provide the highest quality given the change in the network bandwidth may be identified as the target bitrate. Different algorithms and criteria may determine which of the streams is able to provide the highest quality in view of a bandwidth change. For example, in some instances, a bitrate that is closest to an available bandwidth for video streaming in view of the bandwidth change may be selected. In other instances, a bitrate that allows for a predetermined buffering of a selected stream in view of the network bandwidth change may be identified. Other criteria may be used in other instances.

Once the target bitrate has been identified in box 42, in box 43, at least one of the available bitrates between the original bitrate and the target bitrate may be identified. The bitrate(s) that are identified in box 43 may be used for transitioning planning purposes.

In box 44, the original bitrate may be incrementally transitioned between each of the identified bitrates in box 43 over time until the target bitrate is reached. This incremental transition may occur at one or more predetermined rates. In some instances, the transition rate may be selected so that a period for transitioning from the original bitrate to the target bitrate is evenly divided amongst each of the intermediate bitrates in box 43. In other instances the transition rate may vary depending on the intermediate bitrate. For example, a first transition from the original bitrate to a first intermediate bitrate may occur quickly with subsequent transitions to other intermediate bitrates occurring less quickly, or vice versa. Different formulas and criteria may provide a selection of the transition rate and/or how the transition rate is varied.

Upcoming Segment Information Tags

Each segment in a video stream may be encoded with a different number of bits than other segments depending on the complexity of the video data contained in the segment. If the player is able to know in advance the upcoming instantaneous bitrates of different segments of a bitstream, it can more accurately decide which one can be played back smoothly. For video on demand applications, this can be achieved by transmitting a tag or other indicator to the player, such as a #bits tag, which indicated the number of bits used by upcoming segments of the bitstream. The upcoming instantaneous bitrates of different segments can also be inferred from byte offsets of each segment of a media data. Given this bit information on upcoming segments, the player can more accurately compute a highest sustainable rate bitstream given the current buffer state and network condition. This tag information may be stored in the manifest file and then transmitted to the player.

Aside from knowing the number of bits in each upcoming segment, in other embodiments video playback quality may be more precisely controlled with additional information about the visual quality characteristics of encoded video data. This visual quality information may be estimated based on an error calculation performed at the encoder when encoding the video data into segments. The error calculation may be representative of an amount of visual information that is lost during the encoding and image compression process. In general, the more information that is lost during encoding and irrecoverable during decoding, the greater the error during decoding and the poorer the quality of the decode image.

A quality tag or other quality indicator, such as a #quality tag, may be transmitted to the player as well. This quality indicator may indicate a relative estimated quality of upcoming segments of the bitstream based on a calculated error or other criteria during encoding. For example, the quality indicator may include a quality ranking from 0 to 10 (or another scale) depending on an error, such as a mean error, for the segment calculated during encoding by the quality estimator. The quality information may also be stored in the manifest file in some instances.

The player can then use the quality information to plan bitrate changes by postponing and/or expediting a bitrate change to ensure a smooth quality transition during switching. The player can also optimize the quality of the buffered video data during decoding based on the quality information received by the player.

FIG. 5 illustrates a process for adjusting a bitstream rate based on tagged information in video data according to an embodiment of the present invention. An exemplary bitstream 51 may include metadata 52 providing tagged information about the upcoming video segment 53. The bitstream rate may be adjusted on the tagged information provided in the bitstream 51.

A bitstream 51 may include video data encoded into one or more segments 53 and metadata 52 containing information about the video data and/or bitstream 51, which may, in some instances, be obtained from a manifest file. In the example shown in FIG. 5, the bitstream 51 includes metadata 52 containing #bit and #quality tags for each of the four video segments 53 that are numbered 1 to 4 followed by the encoded video data for each of the four segments 53. Although the metadata 52 containing tag information about each of the four segments 53 is shown as preceding each of the four video segments 53, in some instances, the metadata 52 may be split so that the metadata tag information for segment 1 is transmitted immediately before segment 1, the metadata tag information for segment 2 is transmitted immediately before segment 2, the metadata tag information for segment 3 is transmitted immediately before segment 3, and so on. Other sequences for transmitting the metadata 52 may also be used in other embodiments.

During encoding, the encoder may identify the number of bits in each of the video segments 53 and include the identified number of bits for each segment 53 in metadata 52 transmitted to the decoder through the bitstream 51. The encoder may calculate or otherwise identify an error or other encoding quality indicator associated with each of the segments 53 and include the encoding quality indicator for each segment 53 in metadata 52 transmitted to the decoder through the bitstream 51.

In box 55, a number of bits in at least one upcoming video segment 53 of the bitstream 51 may be identified. The number of bits may be identified from the metadata 52 transmitted as part of the bitstream 51 to the player.

In box 56, a highest sustainable future bitstream rate may be computed based on the identified number of upcoming segment bits in box 55, the current buffer state of the player, a network condition and/or available bandwidth ascertained by a bandwidth estimator.

In box 57, a bitstream rate may be adjusted based on the computed highest bitstream rate in box 56 and the number of upcoming bits identified in box 55. Adjusting the bitstream rate may include transitioning to a bitstream having a different bitstream rate. The different bitstream rate may be identified in the manifest file. The player may also In box 58, a bitstream rate may be adjusted based on an identified quality of bits in at least one upcoming segment 53 of the bitstream 51. The quality of bits in at least one upcoming segment may be identified from the metadata 52 transmitted as part of the bitstream 51 to the player. Adjusting the bitstream rate may include transitioning to a bitstream having a different bitstream rate. The different bitstream rate may be identified in the manifest file.

As discussed above, the player can then use the number of upcoming bits identified in box 55 and/or the quality of bits in at least one upcoming segment 53 to plan bitrate changes by postponing and/or expediting the bitrate change to ensure a smooth quality transition during switching. The player can also optimize the quality of the buffered video data during decoding based on the number of upcoming bits and/or the quality information received by the player.

Encoding Techniques

Encoding may also be optimized if the encoder is provided with information about the size of the player's bitstream buffer. By knowing a player's buffer size, the encoder may be able to better allocate bits to prevent a buffer underflow. For example, an encoding bit rate may be slowly lowered in a static section leading up to a busy section, so that more bits can be allocated to the busy section thereby reducing a perceived reduction in quality by a user during playback of the busy section.

The encoder may also be configured to consider the effects of player switching logic during encoding. For example, if the encoder is able to accurately encode a short busy section in an efficient manner (e.g., encoded with an error below a predetermined threshold), the section may be tagged to indicate that a bitrate change is allowed and/or preferred to occur at the section. Similarly, if section is particularly complex or difficult to accurately encode (e.g., encoded with an error equal to or above a predetermined threshold), the section may be tagged to indicate that a bitrate change is not allowed and/or preferred to occur at the section.

FIG. 6 illustrates an exemplary process for optimizing encoding when the encoder is provided with a player buffer size according to an embodiment of the invention.

In box 61, buffer information of a video player may be identified. The buffer information of the video player may indicate a total size of the buffer and/or amount of the buffer with data (e.g., x seconds of video data in the buffer; y bits of data in the buffer, percent of buffer that is full, and/or another type of threshold). The buffer information may be identified based on data provided to the encoder from the player and/or based on estimates made on the buffer information at the encoder end.

In some instances where a video player may have a variable buffer size, the video player may transmit its buffer size information to the encoder over a communications network. In some instances, the encoder may be provided with one or more buffer sizes and may initially identify the buffer size of the player by selecting a buffer size from the provided one or more buffer sizes. In instances where there is more than one available buffer size, the encoder may be provided with one or more criterion for selecting a buffer size. This criterion may include, but is not limited to, a version of the player, a type of device the player is being executed on, a length and/or size of bitstream, data sent to the player, and/or other criterion.

In box 62, an encoding rate of the bitstream being transmitted to the player may be adjusted based on the identified buffer size in box 61. The adjustment may be made to reduce a buffer underflow or a buffer overflow. The buffer underflow may be adjusted so that the playback of the data stream content is not interrupted due to the buffer receiving data at a slower rate than the rate at which the content of the buffer is consumed by the player. The buffer overflow may be adjusted so that the playback of the data stream content is not interrupted due to the buffer receiving data at a faster rate than the rate at which the content of the buffer is consumed by the player.

In box 63, the encoding rate may be adjusted to reduce a buffer underflow by lowering a bitrate in a static section of the bitstream leading up to a busy section. For example, as discussed above, an encoding bit rate may be slowly lowered in a static section leading up to a busy section, so that more bits can be allocated to the busy section thereby reducing a perceived reduction in quality by a user during playback of the busy section.

In box 64, the encoding rate may be adjusted to reduce a buffer underflow by encoding a short busy section of the bitstream at a higher unsustainable rate while lowering the bitrate below a maximum sustainable rate for a static section of the bitstream. For example, an encoding bit rate may be slowly increased in a busy section leading up to a static section, so that less bits can be allocated to the static section thereby reducing a perceived increase in quality by the user during playback of the static section. This may reduce a quality drop in the busy section, where it is more likely to be noticeable by users at the expense of increasing the quality drop in a static section that is less likely to be noticeable by users given a fixed buffer size.

In box 6, the encoding rate may be adjusted to reduce the buffer overflow by encoding the bitstream at a higher bitrate. The adjustment may be made gradually to avoid the sudden quality changes that are disfavored by users. In one embodiment, an encoding bit rate may be slowly increased in a busy section leading up to a static section, while an encoding bit rage of the static section may be maintained the same. This may increase a quality in the busy sections.

Startup Behavior

When a video stream is initially selected to be transmitted to and played at the player, there may be little or no bandwidth history from which a reliable estimate of an available bandwidth may be made. Bandwidth estimators typically formulate an initial bandwidth estimate after fetching segments of a startup bitstream. Rather than blindly selecting one of the available bitstreams and then switching streams when an initial estimate of the available bandwidth is formulated, a last known good state of the network and/or available bandwidth may provide an initially estimate the available bandwidth. By using the last known good state available bandwidth, the player may initially select a bitrate that minimizes startup time.

In other instances, the player or another application associated with the player, such as an Internet browser, may preemptively probe an available bandwidth before the user selects a video stream. For example, the player may probe an available bandwidth after the player is initially executed and before a video stream is launched. In other instances, the player or other application associated with the player may probe the available bandwidth while the user is searching through video streams before making a selection so that the player has the most current estimate of the available bandwidth.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the disclosed embodiments. Other applications of the present invention may be embodied as a hybrid system of dedicated hardware and software components.

The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture, processing and distribution field having the benefit of this disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A method comprising:
   during rendering of a first coded representation of a streamed media asset, when a bitrate change is determined to occur, reviewing manifest information describing different coded representations of the media asset and having redundant content, the different coded representations of the media asset having respective bitrates, segments of the coded representations identified in the manifest information by network locations from which the segments can be retrieved, the manifest information identifying scene cut tags applying in common to temporally-coincident segments of the coded representations;
   identifying a nearest scene cut boundary from scene cut tags included in the manifest information of the media asset;
   calculating whether waiting until the identified scene cut boundary before changing the bitrate will cause a buffer at a bit stream sink to cross a threshold;
   when the buffer is calculated to not cross the threshold, retrieving segment(s) of the first coded representation from a current playback location up to the nearest scene cut boundary from the segment(s)' network location(s) and, thereafter, retrieving segments of a second coded representation of the media asset following the nearest scene cut boundary; and
   when the buffer is calculated to cross the threshold, retrieving segment(s) of the second coded representation from the current playback location up to before the nearest scene cut boundary.

2. The method of claim 1, wherein the retrieving the segments of the second coded representation before the nearest scene cut boundary includes retrieving segments of a third coded representation with a bitrate that is between a bitrate of the first coded representation and a bitrate of the second coded representation.

3. The method of claim 1, wherein when the buffer is calculated to cross the threshold, retrieving segments of a third coded representation from the current playback location up to before the retrieving the segments of the second coded representation, the third coded representation having a bitrate lower than the bitrate of the determined upcoming bitrate change.

4. The method of claim 1, wherein the upcoming bitrate change is determined based on a change in network conditions.

5. The method of claim 1, wherein the upcoming bitrate change is determined based on a change in buffer fullness.

6. The method of claim 1, wherein the upcoming bitrate change is determined based on a change in buffer fullness and a change in a network bandwidth.

7. The method of claim 1, wherein the determining the bitrate change is performed in response to a request from the bit stream sink.

8. The method of claim 1, wherein the method is performed by a distribution device that stores the first coded representation and the second coded representation.

9. The method of claim 1, wherein the method is performed by a player device.

10. A system comprising:
    a buffer at a bit stream sink storing a first coded representation of a streamed media asset; and
    a processor to:
      during rendering of the first coded representation, when a bitrate change is determined to occur, review manifest information describing different coded representations of the media asset and having redundant content, the different coded representations of the media asset having respective bitrates, segments of the coded representations identified in the manifest information by network locations from which the segments can be retrieved, the manifest information identifying scene cut tags applying in common to temporally-coincident segments of the coded representations;
      identify a nearest scene cut boundary from scene cut tags included in the manifest information of the media asset;
      calculate whether waiting until the identified scene cut boundary before changing the bitrate will cause the buffer to cross a threshold;
      when the buffer is calculated to not cross the threshold, retrieve segment(s) of the first coded representation from a current playback location up to the nearest scene cut boundary from the segment(s)' network location(s) and, thereafter, retrieve segments of a second coded representation of the media asset following the nearest scene cut boundary; and
      when the buffer is calculated to cross the threshold, retrieve segment(s) of the second coded representation from the current playback location up to before the nearest scene cut boundary.

11. The system of claim 10, wherein the processor is on a distribution device that stores the first coded representation and the second coded representation.

12. The system of claim 10, wherein the processor is on a player device.

13. A non-transitory computer-readable medium storing instructions that, when executed by a processor, cause the processor to:

during rendering of a first coded representation of a streamed media asset, when a bitrate change is determined to occur, review manifest information describing different coded representations of the media asset and having redundant content, the different coded representations of the media asset having respective bitrates, segments of the coded representations identified in the manifest information by network locations from which the segments can be retrieved, the manifest information identifying scene cut tags applying in common to temporally-coincident segments of the coded representations;

identify a nearest scene cut boundary from scene cut tags included in the manifest information of the media asset;

calculate whether waiting until the identified scene cut boundary before changing the bitrate will cause a buffer at a bit stream sink to cross a threshold;

when the buffer is calculated to not cross the threshold, retrieve segment(s) of the first coded representation from a current playback location up to the nearest scene cut boundary from the segment(s)' network location(s) and, thereafter, retrieve segments of a second coded representation of the media asset following the nearest scene cut boundary; and when the buffer is calculated to cross the threshold, retrieve segment(s) of the second coded representation from the current playback location up to before the nearest scene cut boundary.

14. The medium of claim 13, wherein the determining the bitrate change is performed in response to a request from the bit stream sink.

15. The medium of claim 13, wherein the processor is on a distribution device that stores the first coded representation and the second coded representation.

16. The medium of claim 13, wherein the processor is on a player device.

17. The method of claim 7, further comprising:
identifying at least one intermediate coded representation of the media asset having a bitrate between the bitrates of the first coded representation and the second coded representation; and
incrementally transitioning from the bitrate of the first coded representation to the bitrate of the second coded representation through the at least one intermediate coded representation.

18. The method of claim 17, wherein the transition(s) through the intermediate coded representation(s) is made before a scene cut boundary.

19. The method of claim 17, wherein the transition(s) through the intermediate coded representation(s) is made before the nearest scene cut boundary.

20. The method of claim 1, wherein when the buffer is calculated to cross the threshold, the bitrate of the second coded representation is calculated to be the minimum bitrate necessary for the second coded representation to reach the identified scene cut boundary.

21. A method comprising:

during rendering of a first coded representation of a streamed media asset, when a bitrate change is determined to occur, reviewing manifest information describing different coded representations of the media asset and having redundant content, the different coded representations of the media asset having respective bitrates, segments of the coded representations identified in the manifest information by network locations from which the segments can be retrieved, the manifest information identifying scene cut tags applying in common to temporally-coincident segments of the coded representations;

identifying a nearest scene cut from scene cut tags included in the manifest information of the media asset, wherein the nearest scene cut is defined by a start frame and a subsequent end frame;

calculating whether the first coded representation will reach at least the start frame of the nearest scene cut before causing a buffer at a bit stream sink to cross a threshold;

when the buffer is calculated to not cross the threshold, retrieving segment(s) of the first coded representation from a current playback location up to the start frame of the nearest scene cut and, thereafter, retrieving segments of a second coded representation of the media asset following the start frame of the nearest scene cut; and when the buffer is calculated to cross the threshold, retrieving segment(s) of the second coded representation from the current playback location up to before the start frame of the nearest scene cut.

22. The method of claim 21, wherein when the buffer is calculated to not cross the threshold, retrieving segments of the first coded representation from a current playback location up to a playback location between the start frame and the end frame.

* * * * *